(12) United States Patent
Kimura

(10) Patent No.: US 7,327,065 B2
(45) Date of Patent: Feb. 5, 2008

(54) MOTOR, STATOR FOR THE SAME, AND MANUFACTURING METHOD THEREOF

(75) Inventor: Nobuho Kimura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/064,676

(22) Filed: Feb. 24, 2005

(65) Prior Publication Data

US 2005/0206265 A1 Sep. 22, 2005

(30) Foreign Application Priority Data

Mar. 16, 2004 (JP) ............... P2004-074565

(51) Int. Cl.
*H02K 3/00* (2006.01)

(52) U.S. Cl. ..................... 310/216; 310/254

(58) Field of Classification Search ........ 310/216–218, 310/89, 67 R, 254
See application file for complete search history.

(56) References Cited

U.S. PATENT DOCUMENTS

| | | | | |
|---|---|---|---|---|
| 4,741,093 A | * | 5/1988 | Rist | ............................. 29/596 |
| 6,097,121 A | * | 8/2000 | Oku | ............................. 310/91 |
| 6,265,804 B1 | * | 7/2001 | Nitta et al. | ................. 310/259 |
| 6,344,946 B1 | * | 2/2002 | Papst | ....................... 360/99.08 |
| 2001/0045782 A1 | * | 11/2001 | Lieu et al. | ................. 310/67 R |
| 2003/0020358 A1 | * | 1/2003 | Masumoto et al. | ......... 310/216 |
| 2003/0030345 A1 | * | 2/2003 | Enomoto et al. | ........... 310/216 |
| 2004/0140728 A1 | * | 7/2004 | Dairi | .......................... 310/217 |
| 2005/0044714 A1 | * | 3/2005 | Yamashita et al. | ...... 29/898.042 |
| 2005/0134124 A1 | * | 6/2005 | Lieu et al. | ..................... 310/43 |

FOREIGN PATENT DOCUMENTS

| JP | 04-295256 A | | 10/1992 |
|---|---|---|---|
| JP | 05292708 A | * | 11/1993 |
| JP | 2003-235217 A | | 8/2003 |
| JP | 2003-319602 A | | 11/2003 |

* cited by examiner

*Primary Examiner*—Thanh Lam
(74) *Attorney, Agent, or Firm*—Lerner, David, Littenberg, Krumholz & Mentlik, LLP

(57) ABSTRACT

A motor having a stator that is configured by including a plurality of magnetic partial core members, which have a plurality of split ring cores forming a ring and coil support cores projecting outwardly from the respective center portions of the split ring cores. The partial core members are arranged and secured in a ring-shape with predetermined slits between them, and coils are mounted on each of the coil support cores, respectively. Accordingly, it is possible to obtain a thin and flat motor, in which coils are easy to wind, cogging diminishes, and assemble is easy to carry out, even if the outside diameter of the motor should be reduced.

7 Claims, 8 Drawing Sheets

PRIOR ART

MOTOR, STATOR FOR THE SAME, AND MANUFACTURING METHOD THEREOF

CROSS REFERENCES TO RELATED APPLICATIONS

The present document is based on Japanese Priority Document JP2004-074565, filed in the Japanese Patent Office on Mar. 16, 2004, the entire contents of which being incorporated herein by reference.

BACKGROUND OF THE INVENTION

1. Field of the Invention

The present invention relates to a small and thin motor, a stator for the motor, and a method of manufacturing the same.

2. Description of Related Art

A motor and a stator for the motor in the related art will be described with reference to FIGS. 9 to 13.

FIG. 9 is a sectional view of a conventional motor. FIG. 10 is a plan view of a stator assembled in the motor shown in FIG. 9. FIG. 11 is a plan view of other conventional stator. FIG. 12 is a perspective view of part of a core member of the stator shown in FIG. 11. FIG. 13 is a plan view of the core member shown in FIG. 12 with windings.

The conventional motor will now be described with reference to FIGS. 9 and 10. A motor 10 is an outer rotor type motor including a stator 20, a rotor 30, and a rotating shaft 40.

The stator 20 is constituted by a flat ring-shaped housing 21 made from a magnetic steel plate, and a doughnut-shaped laminate core 24 as shown in FIG. 10. The housing 21 has an inner peripheral wall 22 and an outer peripheral wall 23. The outer peripheral portion of the laminate core 24 is divided by six slits 25 into six sections, winding spaces 26 are provided in their respective middle portions, and coils 27 are wound around the winding spaces 26, respectively. The stator 20 has a structure in which the laminate core 24 is press-inserted into the inner peripheral wall 22, and then adhesively bonded.

The rotor 30 is constituted by a cylindrical rotor case 31 and a magnet 33 for rotary drive. The magnet 33 is secured to the inside face of an outer peripheral wall 32 of the rotor case 31. The rotor case 31 is supported at the center portion by the rotating shaft 40. The outer peripheral wall 32 of the rotor case 31 and the magnet 33 are disposed such that they are positioned between the outer peripheral portion of the laminate core 24 and the outer peripheral wall 23 of the housing 21.

The rotating shaft 40 is supported so as to be rotatable by a fluid dynamic bearing 41 and a thrust bearing 42 in the interior of an inside diameter side cylindrical portion 22 of the housing 21.

Therefore, the motor 1 rotates by transmitting rotating torque obtainable from the magnet 33 and the outer periphery of the laminate core 24 via the rotor case 31 to the rotating shaft 40.

If the outside diameter of the motor 10 so configured is reduced with the aim of miniaturization, the winding spaces 26 diminish and, in addition, there occurs difficulty in the work of winding the coils 27 through a width W of the narrow slits 25, which is, for example, approximately 0.3 mm.

For instance, Japanese Patent Application Publication No. 2003-9444 (page 5, and FIG. 4) discloses the stator shown in FIG. 11, as one structure of a motor for solving the coil winding work problem encountered in miniaturizing the motor 10. A stator core 50 is divided into a plurality of core members 51 as shown in FIG. 12, nine of these core members being shown in FIG. 11.

The manufacture of the stator core 50 includes the step in which the core members 51 are prepared separately, a coil 53 is previously wound around a body portion 52 of each of the core members 51, and these core members 51 are arranged in a ring-shape by fitting and bonding their adjacent end faces to each other.

SUMMARY OF THE INVENTION

The manufacture of the stator core 50, therefore, requires a forming machine for manufacturing the core members 51, a special winding machine for winding the coils 53 around the core members 51, a jig for arranging the core members 51 in the ring-shape, and the step of fitting and bonding the end faces of the respective core members 51.

The present invention provides a thin and flat motor that, if the outside diameter of the motor should be reduced, coils of which are easy to mount, cogging of which is diminished, and assemble of which is easy to carryout, as well as to provide a stator for the motor, and a method of manufacturing the stator.

In a stator for a motor of the present invention, a plurality of magnetic partial core members, each of which has a plurality of split ring cores to form a ring and coil support cores projecting outwardly from center portions of the split ring cores are arranged and secured in a ring-shape with predetermined slits between them. Coils are mounted on the coil support cores, respectively.

Each of the slits is filled with resin to integrate all of the magnetic partial core members. The split ring cores are laminate cores, the surface of which is coated with insulating material. The stator for a motor is suitably used in an inner rotor type motor.

Alternatively, the stator for a motor further includes a flat magnetic housing that has an outer peripheral wall whose inside diameter equals a diameter of a circle defined by edges of the respective coil support cores, and an inner peripheral wall of a diameter shorter than a diameter of the ring. The plurality of magnetic partial core members are arranged, secured and housed in a ring-shape with predetermined slits between them, so that the edges of the respective coil support cores abut an inside face of the outer peripheral wall of the flat magnetic housing.

A motor of the present invention includes: a stator including a plurality of magnetic partial core members each having a magnetic split ring core and a coil support core being wound a coil and projecting outwardly from a center portion of the magnetic split ring core, the magnetic partial core members being arranged and secured to each other to be a ring-shape with predetermined slits therebetween, wherein the plural magnetic partial core members housed in a flat magnetic housing which has an outer peripheral wall whose diameter equals to a diameter of a circle defined by connecting edges of the coil support cores, and an inner peripheral wall whose diameter is shorter than a diameter of the ring; wherein the plural magnetic partial core members is arranged and secured to each other to be the ring-shape with predetermined slits therebetween so that the edges of the coil support cores abut on an inside surface of the outer peripheral wall of the flat magnetic housing; a rotor case provided above the stator and supporting a magnet which is rotatable between an inside surface of each of the plural magnetic partial core members and the inside surface of the outer peripheral wall; a rotating shaft mounted perpendicularly relative to the flat surface at a center of the rotor case; and a bearing provided within the inner peripheral wall of the flat magnetic housing for rotatably supporting the rotating shaft.

Preferably, each of the magnetic partial core members is a laminated core, and each of the slits is filled with resin thereby to integrate all the magnetic partial core members. Preferably, the bearing is a fluid dynamic bearing. Additionally, the motor is a spindle motor.

A method of manufacturing a stator for a motor includes the steps of: forming split ring cores, which form a ring together, and a plurality of coil support cores each being wound a coil and projecting outwardly from a central portion of the split ring cores by punching a magnetic laminated plate made of a stacked plurality of magnetic thin plates so as to form a circular hole, a plurality of sector holes having a predetermined width outwardly from the circular hole and arranged in a circumferential direction of the circular hole with a predetermined space, and slits extending between the circular hole and a central portion of the sector holes; filling each of the slits with resin; forming a thin-film insulating layer on a surface extending from the split ring cores to an intermediate portion of the plurality of the coil support cores; forming a stator core having a plurality of magnetic partial core members, each of which is constituted by the split ring core and the coil support core, arranged to form a ring-shape by cutting at the intermediate portion of the plurality of the coil support cores at which the insulating layer is not formed; securing the coils by inserting previously formed coils to each of the coil support cores; and connecting each of the coils to be conduction states.

The method of manufacturing a stator for a motor further includes the step of mounting the stator core on a housing.

Preferably, the thickness of each of the magnetic thin plates constituting the magnetic laminate plate is approximately 0.2 mm.

Thus, in accordance with the stator for a motor of the present invention, the outside diameter of the stator can be reduced, the diameter of the stator core can be reduced, and the slits can be narrowed. In addition, the coils can be easily wound.

In accordance with the motor of the present invention, the thickness of the motor can be reduced, and its outside diameter can be reduced. Further, the slits of the stator core can be narrowed to produce gradual magnetic variations, thereby providing a motor that causes less static torque variations.

In accordance with the method of manufacturing a stator for a motor, even if a plurality of magnetic partial core members are punched from a single laminate plate, the magnetic partial core members can be formed integrally with accuracy, without separating them. Slits can also be narrowed.

DETAIL DESCRIPTION OF THE PREFERRED EMBODIMENTS

Embodiments of a motor, a stator for a motor, and a method of manufacturing a stator of the present invention will be described below by referring to the accompanying drawings.

EXAMPLE 1

Figure 1A:
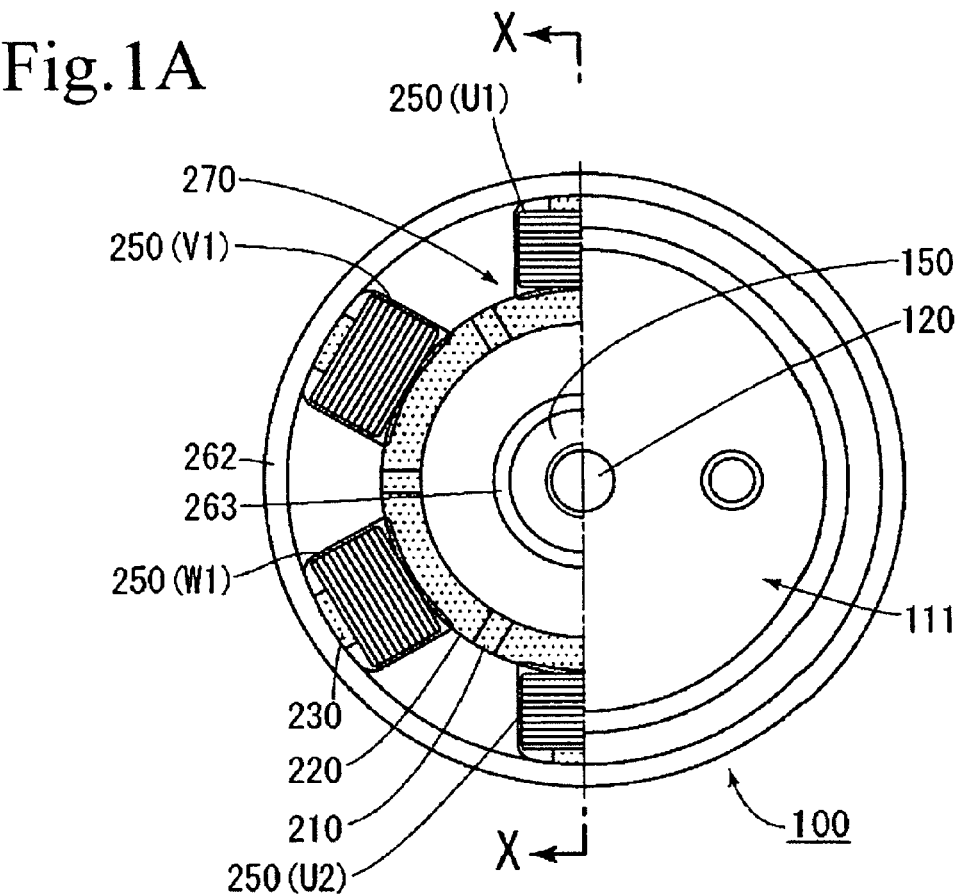
FIG. 1A is a top view, partially broken away, of a rotor case of a motor of one embodiment in the present invention
Figure 1B:
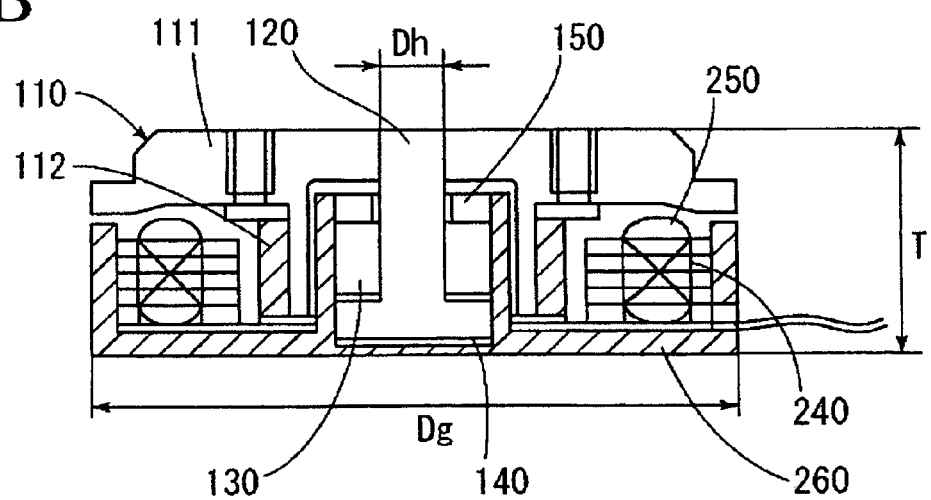
FIG. 1B is a sectional view taken along the line X-X in FIG. 1A.
Figure 2A:
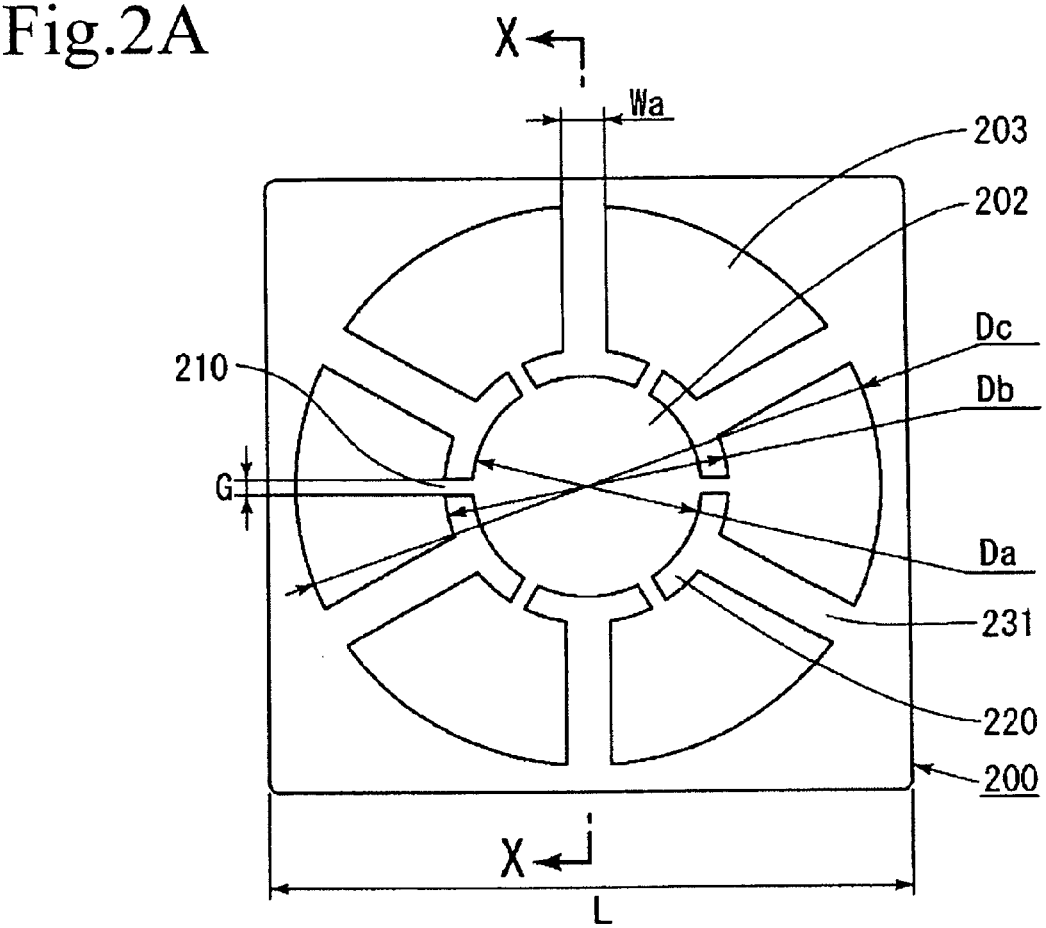
FIG. 2A is a plan view of the step of punching when manufacturing a stator suitable for the motor shown in FIGS. 1A and 1B.
Figure 2B:
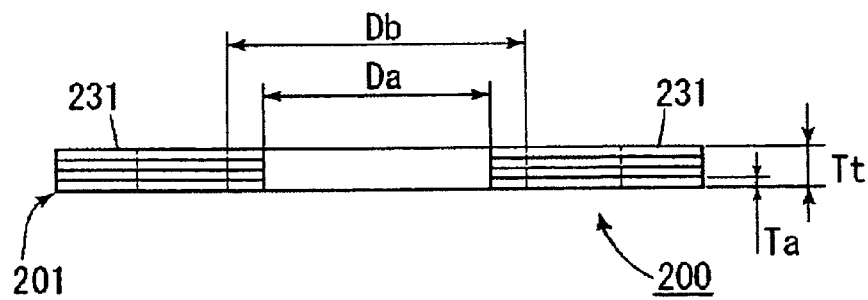
FIG. 2B is a sectional view taken along the line X-X in FIG. 2A.
Figure 3A:
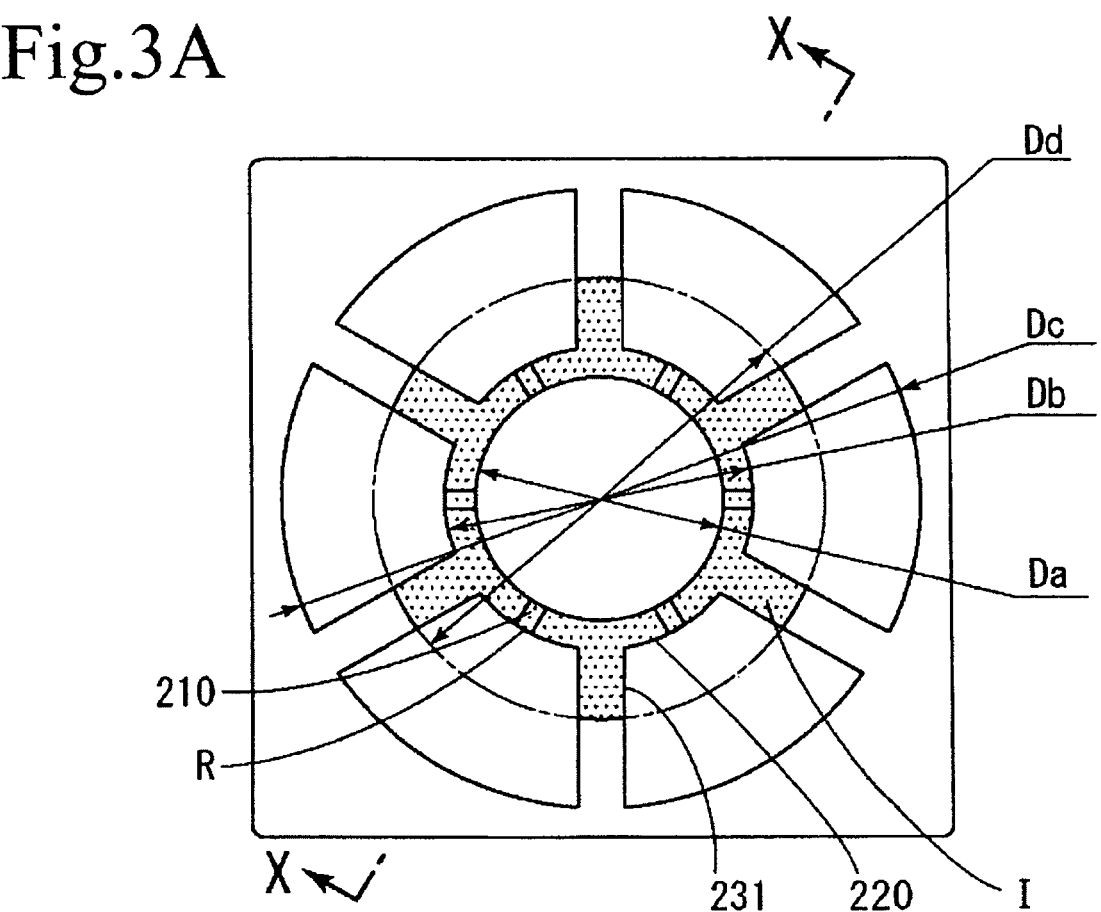
FIG. 3A is a plan view of the step of filling with resin and forming an insulating layer, subsequently to the step of punching shown in FIGS. 2A and 2B.
Figure 3B:
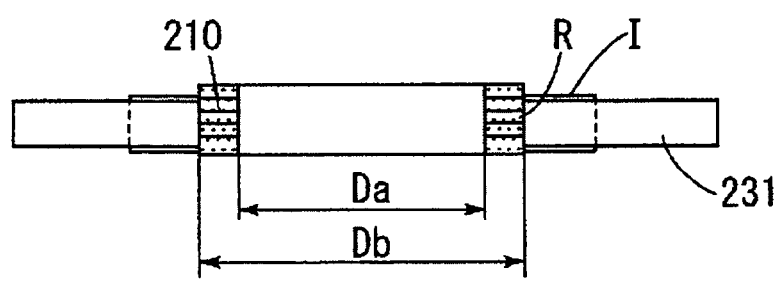
FIG. 3B is a sectional view taken along the line X-X in FIG. 3A.
Figure 4A:
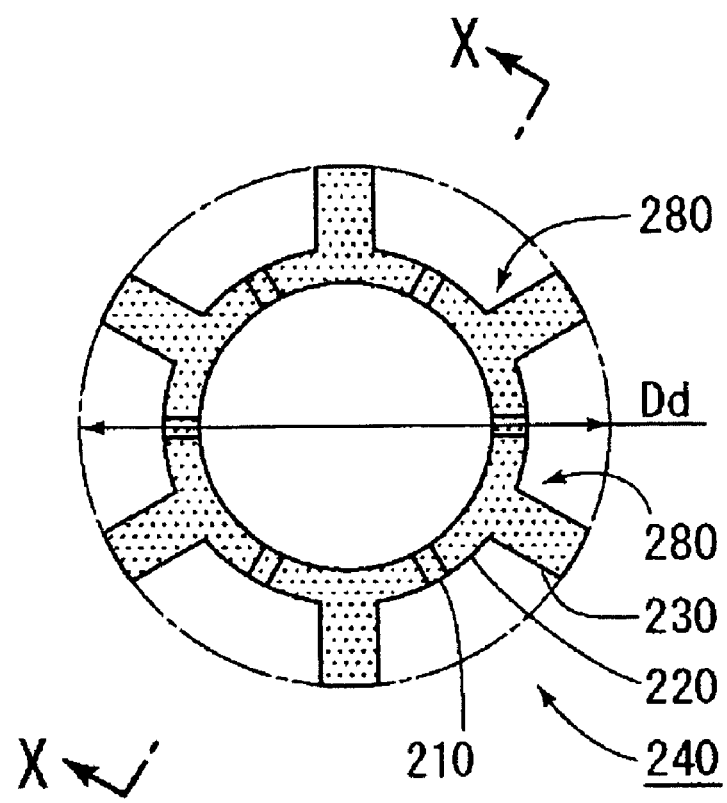
FIG. 4A is a plan view of a stator core obtained after the step of cutting, subsequently to the step of filling with resin and forming an insulating layer shown in FIGS. 3A and 3B.
Figure 4B:
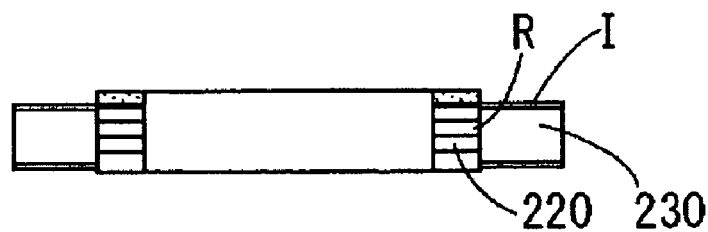
FIG. 4B is a sectional view taken along the line X-X in FIG. 4A.
Figure 5A:
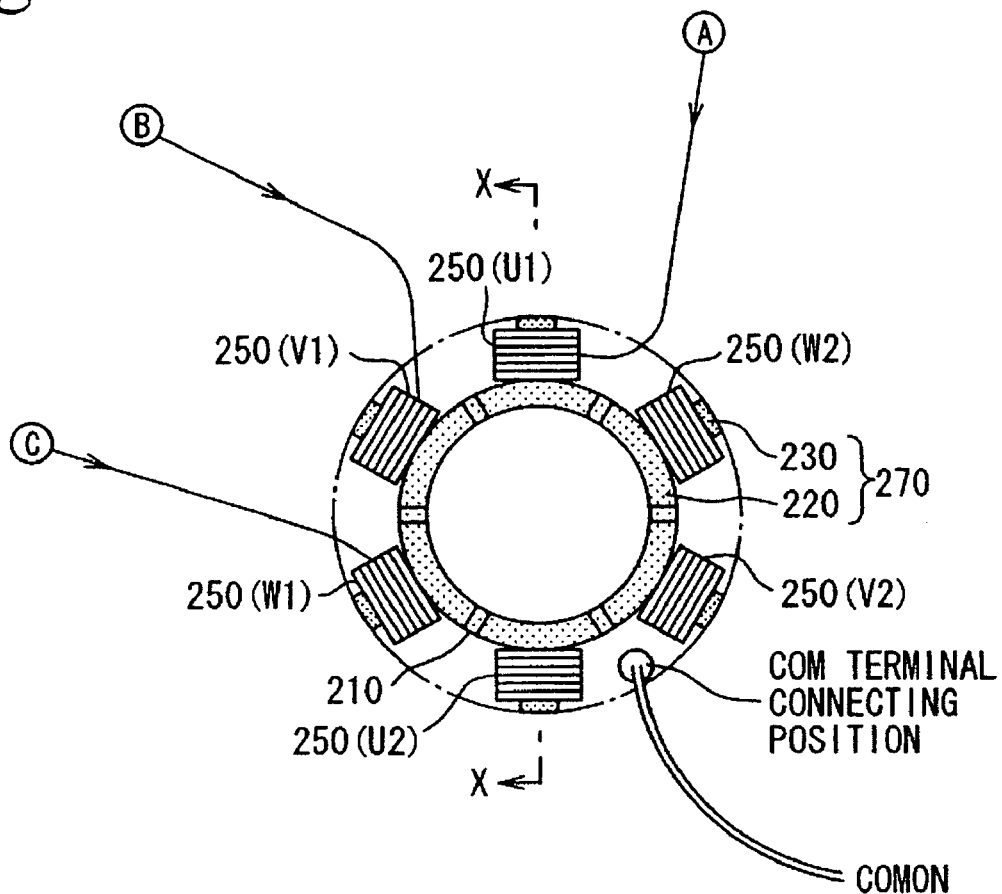
FIG. 5A is a plan view of the step of mounting a coil on the stator core shown in FIGS. 4A and 4B.
Figure 5B:
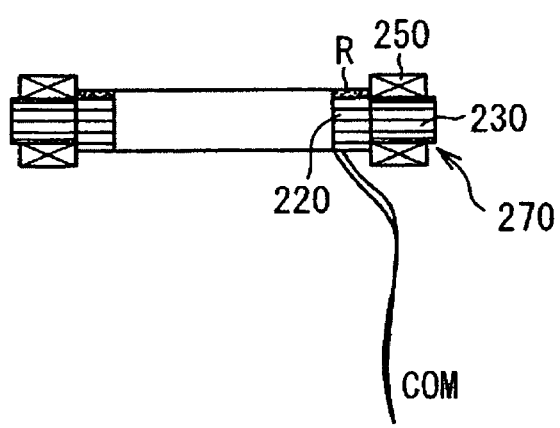
FIG. 5B is a sectional view taken along the line X-X in FIG. 5A.
Figure 6A:
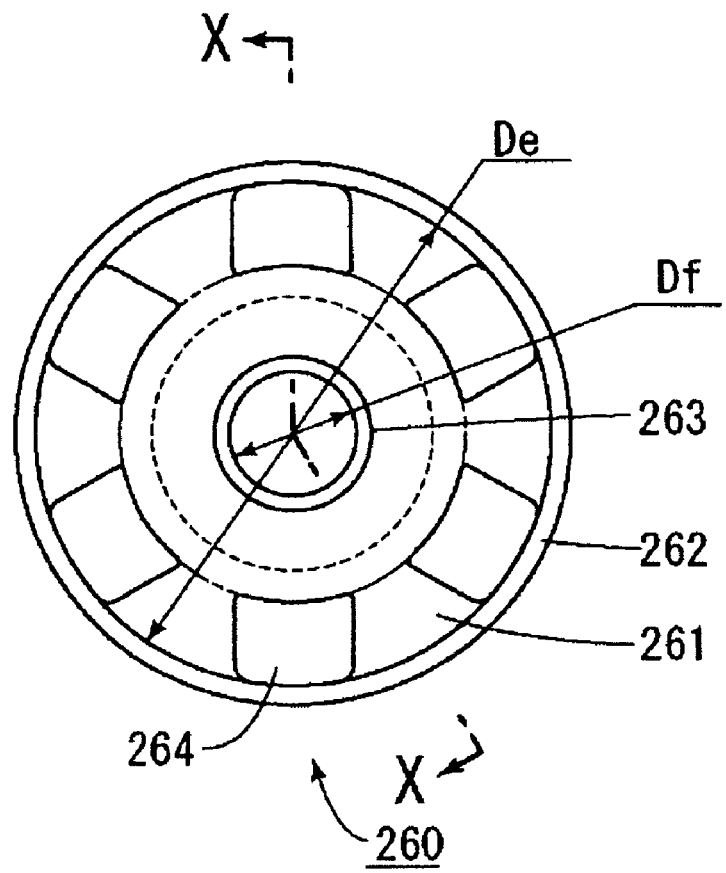
FIG. 6A is a top view of a housing.
Figure 6B:
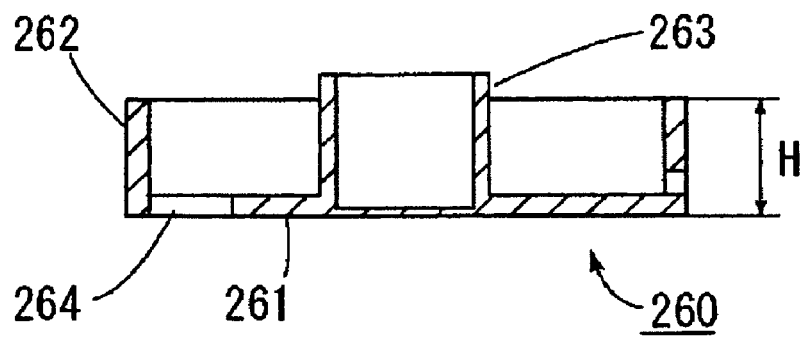
FIG. 6B is a sectional view taken along the line X-X in FIG. 6A.
Figure 7:
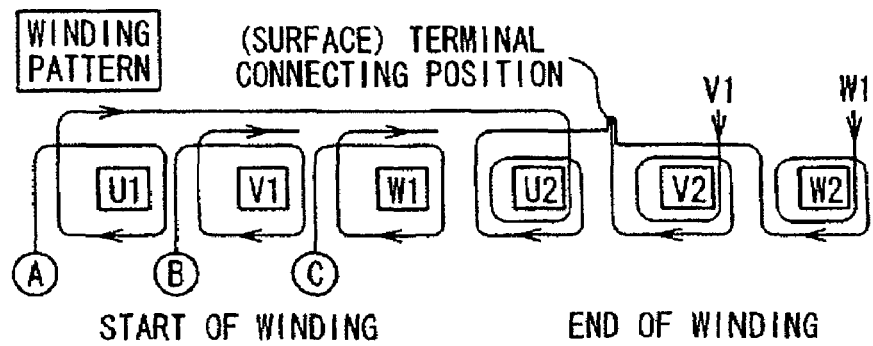
FIG. 7 is a connection diagram of the coil shown in FIGS. 5A and 5B.
Figure 8:
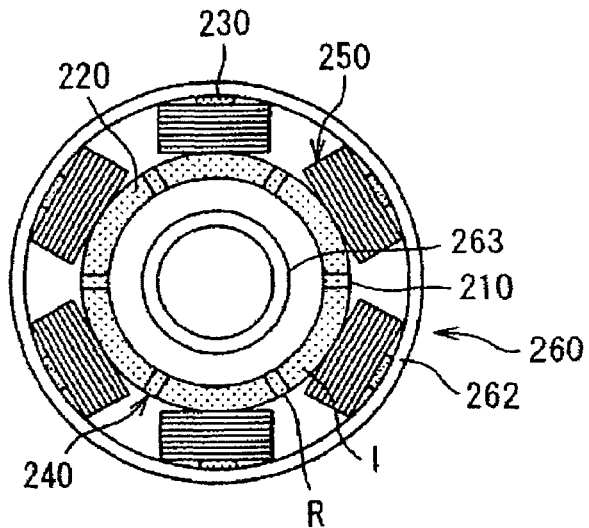
FIG. 8 is a plan view showing the arrangement of a stator core and a housing.
Figure 9:
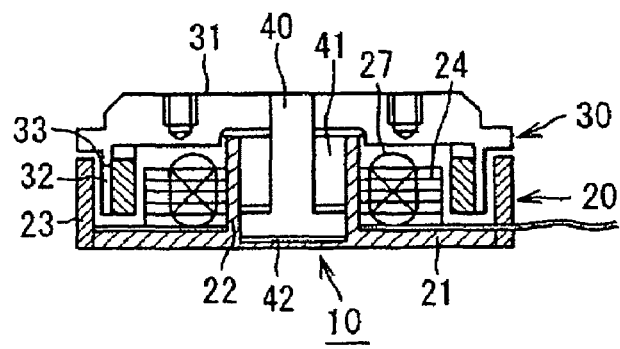
FIG. 9 is a sectional view of a conventional first type motor.
Figure 10:
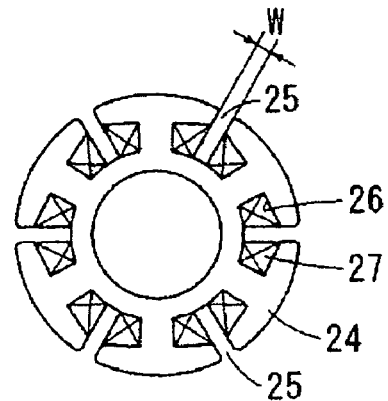
FIG. 10 is a plan view of a stator assembled in the motor of FIG. 9.
Figure 11:
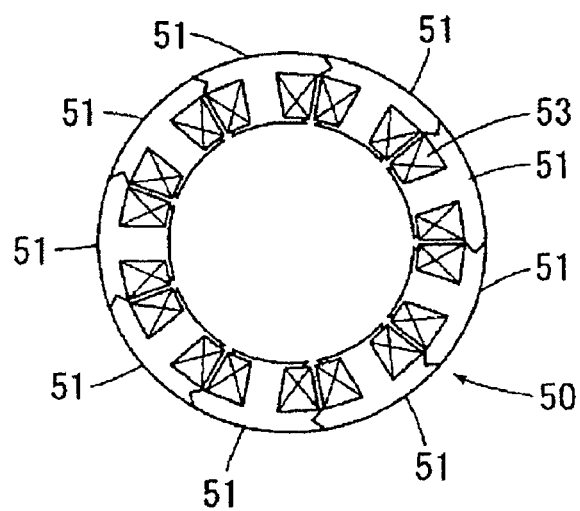
FIG. 11 is a plan view of another type of stator assembled in a conventional second type motor.
Figure 12:
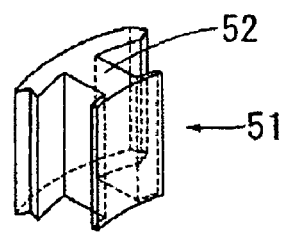
FIG. 12 is a perspective view of part of a core member of the stator shown in FIG. 11.
Figure 13:
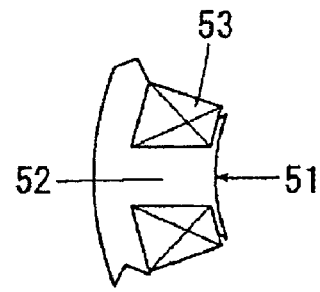
FIG. 13 is a plan view of the core member of FIG. 12 with windings.

FIG. 1A is a top view, partially broken away, of a rotor case of a motor of one embodiment in the present invention, and FIG. 1B is a sectional view taken along the line X-X in FIG. 1A. FIG. 2A is a plan view of the step of punching when manufacturing a stator suitable for the motor shown in FIGS. 1A and 1B, and FIG. 2B is a sectional view taken along the line X-X in FIG. 2A. FIG. 3A is a plan view of the step of filling with resin and forming an insulating layer, subsequently to the step shown in FIGS. 2A and 2B, and FIG. 3B is a sectional view taken along the line X-X in FIG. 3A. FIG. 4A is a plan view of a stator core obtained after the step of cutting, subsequently to the step shown in FIGS. 3A and 3B, and FIG. 4B is a sectional view taken along the line X-X in FIG. 4A. FIG. 5A is a plan view of the step of mounting a coil on the stator core shown in FIGS. 4A and 4B, and FIG. 5B is a sectional view taken along the line X-X in FIG. 5A. FIG. 6A is a top view of a housing and FIG. 6B is a sectional view taken along the line X-X in FIG. 6A. FIG. 7 is a connection diagram of the coil shown in FIGS. 5A and 5B. FIG. 8 is a plan view showing the arrangement of a stator core and a housing.

The construction of a motor of the embodiment will be described with reference to FIGS. 1A and 1B.

In FIGS. 1A and 1B, reference numeral 100 indicates a motor of the present invention. The motor 100 is an inner rotor type motor including a stator 270, a rotor 110, a rotating shaft 120, a fluid dynamic bearing 130, a thrust bearing 140, and an upper plate 150.

A stator 270 is a structure obtainable from a method of manufacturing a stator for a motor of the present invention, which will be described later with reference to FIG. 2A to FIG. 8. That is, as shown in FIG. 8, this structure can be obtained by fitting a stator core 240 having coils 250 (U1, V1, W1, U2, V2, and W2) mounted thereon as shown in FIGS. 5A and 5B, into a housing 260 made of a magnetic steel plate as shown in FIGS. 6A and 6B (the details will be presented later).

In the stator core 240, as shown in FIGS. 4A and 4B, a plurality of magnetic partial core members 280, each of which has a plurality of split ring cores 220 to form a ring and coil support cores 230 projecting outwardly from center portions of these ring cores 220 are disposed and secured in a ring-shape with predetermined slits 210 between them. As shown in FIGS. 5A and 5B, the coils 250 are mounted on the coil support cores 230, respectively. The stator core 240 may be made of a laminate plate or a metal powder injection-molded article. The coils 250 employ a bobbin-shaped chip coil for the sake of winding simplicity.

The rotor 110 is constituted by a disc-shaped rotor case 111 and a magnet 112 for rotary drive. The magnet 112 is on the inner periphery side of the rotor case 111, and secured such that the rotor 110 is rotatable between the inside of the split ring cores 220 of the stator 270 and an inner cylinder 263 of the housing 260. The rotor case 111 may be formed from stainless steel, SUS430, for example.

At a rotation center of the rotor case 111, the rotating shaft 120 is perpendicularly secured to an inside face of the rotor case 111. The rotating shaft 120 is supported so as to be rotatable by the fluid dynamic bearing 130 and the thrust bearing 140 that are fitted into the inner cylinder 263 of the housing 260.

The upper plate 150 is a member for preventing oil leakage, and is shaped as a cylinder with a bottom. The bottom has at its center portion a round hole through which the rotating shaft 120 can be inserted. The cylindrical portion of the upper plate 150 is fitted and secured to the inside of the inner cylinder 263 of the housing 260.

Thus, in the motor 100, a fluctuating magnetic field generated by the stator core 240 and the coils 250 acts on the magnet 112, so that rotating torque is generated to rotate the rotor case 111, thereby producing rotation of the rotating shaft 120. Also in the case where the motor 100 is a fluid dynamic bearing motor, a radial shaft and a thrust shaft are disposed separately, and dynamic pressure generating grooves, through which dynamic pressure is applied to each of these shafts, are formed in the rotating shaft 120.

For example, the dimensions of the respective parts of the motor 100 are as follows: an outside diameter Dg of the motor 100 is 8.5 mm; a thickness T is 2.9 mm; and a diameter Dh of the rotating shaft 120 is 0.8 mm.

A method of manufacturing a stator for a motor of the present invention will next be described with reference to FIG. 2A to FIG. 8.

First, as shown in FIGS. 2A and 2B, a magnetic laminate plate 200 is prepared. The magnetic laminate plate 200 is a laminate plate made by laminating, for example, four magnetic thin plates 201, such as square silicon steel plates, 0.2 mm in thickness Ta and 35 mm in one side length L, so as to have an overall thickness Tt of approximately 0.8 mm.

Subsequently, as shown in the figures, six split ring cores 220 to form a ring, and six coil support core members 231 projecting outwardly from center portions of these split ring cores 220 are formed by punching: one round hole 202 at the center of the magnetic laminate plate 200; sector holes 203 of a plurality of numbers (six in the case of this embodiment), which are outwardly spaced a predetermined width from the round hole 202, and disposed in the circumferential direction of the round hole 202 with predetermined intervals; and slits 210 continuous with the round hole 202 and the center portions of the sector holes 203. These split ring cores 220 can be retained at predetermined spaced intervals in the same plane, since they are integrally connected with the magnetic laminate plate 200 around them.

For example, a width G of the slits 210 is 0.3 mm, a diameter Da of an inner periphery defined by the six split ring cores 220 (i.e., the round hole 202) is 4.3 mm, a diameter Db of an outer periphery defined by the six split ring cores 220 is 5.35 mm, a diameter Dc of a circle defined by the edges of the six coil support core members 231 is 11 mm, and a width Wa of the coil support core members 231 is 0.8 mm.

Then, as shown in FIGS. 3A and 3B, an insulating layer I is formed by filling each slit 210 with resin R to secure the split ring cores 220 (FIG. 3B), and then applying an insulting material to coat both top and bottom surfaces of the split ring cores 220 and the coil support core members 231 in the range of a diameter Dd including the resins R, to have a thickness of, for example, 50 µm. For example, the diameter Dd is approximately 7.7 mm.

Subsequently, the coil support core members 231 are cut along the circle of the diameter Dd, to obtain an integrated stator core 240 as shown in FIGS. 4A and 4B, in which six magnetic partial core members 280 constituted by the split ring cores 220 and the coil support cores 230 are arranged in a circle with the slits 210 between them, and the circle defined by the edges of the coil support cores 230 equals the diameter Dd.

Then, as shown in FIGS. 5A and 5B, cylindrical coils 250 (U1, V1, W1, U2, V2, and W2), which are otherwise prepared separately, are inserted in and attached to the coil support cores 230, respectively, and then bonded with adhesive. The connections of these six coils 250 are connected to a three-phase-alternating current so as to be energized, as shown in FIG. 7.

The stator core 240 with the coils 250 mounted thereon is then housed in a housing 260 as shown in FIGS. 6A and 6B. The housing 260 is integrally formed by a magnetic steel plate, and has an outer cylinder 262 having an inside diameter of De, which is formed at an outer periphery portion of a disc-like bottom plate 261 and is disposed perpendicularly to the bottom plate 261, and an inner cylinder 263 having an inside diameter of Df, which is formed at a center portion of the bottom plate 261 and is disposed perpendicularly to the bottom plate 261. The inner cylinder 263 is slightly higher than the outer cylinder 262. A bearing is fit into the inner cylinder 263. There are holes 264 formed at which the respective support cores 230 and the coils 250 are disposed on the bottom plate 261. The portion indicated by the dotted line in FIG. 6A indicates the area at which the split ring cores 220 of the stator core 240 are positioned.

For example, the inside diameter De is 7.9 mm, the inside diameter Df is 2 mm, the thickness of the outer cylinder 262 is 0.6 mm, the thickness of the inner cylinder 263 is 0.4 mm, and a height H of the outer cylinder 262 is 1.6 mm. Note that these dimensions are cited merely by way of example and without limitation.

As shown in FIG. 8, the stator core 240 is fit into the housing 260 so constructed. At the time of fitting, the inner peripheral face of the outer cylinder 262 of the housing 260 is brought into contact with the edges of the coil support cores 230 of the stator core 240, and then adhesively bonded thereto, through adhesive such as resin. This involves that the split ring cores 220 are positioned at the round area indicated by the dotted line in the housing 260. Thus, the stator 270 for a motor 100 of the present invention is completed.

The stator 270 for a motor 100 so constructed is mounted on the motor of the present invention as shown in FIGS. 1A and 1B.

As above described, the present invention provides the motor of extremely small size, which facilitates mounting of coils and considerably reduce cogging. In particular, in the step of manufacturing the stator cores, they can be formed in a ring-shape, without separating a plurality of split ring cores. This enables manufacturing of a stator for a motor favorable in accuracy.

What is claimed is:

1. A stator for a motor comprising:
    a plurality of magnetic partial core members each having a magnetic split ring core element and a coil support core projecting outwardly from a center portion of said magnetic split ring core element, said plurality of magnetic partial core members being arranged and secured to each other to be in a ring-shape so as to form a circular hole to receive a rotor and with a slit formed between adjacent ones of said magnetic split ring core elements;
    a plurality of preformed cylindrical coils prepared separately from said magnetic partial core members and inserted in and attached to said coil support cores of said plurality of magnetic partial core members; and
    a flat magnetic housing having an outer peripheral wall whose diameter is equal to a diameter of a circle defined by connecting outer edges of the coil support cores, an inner peripheral wall that is higher than said outer peripheral wall and whose diameter is smaller than a diameter of the circular hole formed by the magnetic split ring core elements, and holes arranged for the coils, wherein the outer edges of the coil support cores abut on an inside surface of the outer peripheral wall of the flat magnetic housing,
    wherein said plurality of magnetic partial core members are integrated and secured to each other by filling said slits with resin, each slit being formed between adjacent ones of said magnetic split ring core members.

2. The stator as cited in claim 1, wherein each of said plurality of magnetic partial core members form a laminated core element; and
    each surface of the laminated core element is coated with an insulating material.

3. A motor comprising:
    a stator including a plurality of magnetic partial core members each having a magnetic split ring core element and a coil support core having a pre-formed cylindrical coil prepared separately from said magnetic partial core members and inserted in and attached to said coil support core and projecting outwardly from a center portion of the magnetic split ring core element, said plurality of magnetic partial core members being arranged to be in a ring-shape with a slit having a predetermined width formed between adjacent ones of said magnetic split ring core elements, wherein each slit is filled with resin so that said magnetic split core ring elements are secured to each other in the ring shape, wherein said plurality of magnetic partial core members are housed in a flat magnetic housing that has an outer peripheral wall whose diameter equals a diameter of a circle defined by connecting outer edges of said coil support cores, an inner peripheral wall that is higher than said outer peripheral wall and whose diameter is smaller than a diameter of said ring shape formed by said magnetic split ring core, and holes arranged for the coils; wherein
    said plurality of magnetic partial core members are arranged and secured to each other to be in said ring-shape with said resin-filled slits therebetween so that the outer edges of said coil support cores abut on an inside surface of said outer peripheral wall of said flat magnetic housing;
    a rotor case provided above said stator and supporting a magnet that is rotatable between an inside surface of said ring shape formed by said plurality of magnetic partial core members and said inside surface of said inner peripheral wall;
    a rotating shaft mounted perpendicularly relative to a flat surface at a center of said rotor case; and
    a bearing provided within said inner peripheral wall of said flat magnetic housing for rotatably supporting said rotating shaft.

4. The motor as cited in claim 3, wherein each of said magnetic partial core members is a laminated core element.

5. The motor as cited in claim 3, wherein said bearing is a fluid dynamic bearing.

6. The motor as cited in claim 3, wherein said motor is a spindle motor.

7. A method of manufacturing a stator for a motor comprising the steps of:
    forming a plurality of split ring cores, which form a ring together, and a plurality of coil support cores each having wound thereon a coil and projecting outwardly from a central portion of said plurality of split ring cores by punching a magnetic laminated plate made of a stacked plurality of magnetic thin plates so as to form a circular hole to receive a rotor of the motor, a plurality of sector holes having a predetermined width outwardly from said circular hole and arranged in a circumferential direction of said circular hole with a predetermined space, and slits extending between said circular hole and a central portion of said sector holes, so as to form a slit having a predetermined width between adjacent ones of said plurality of split ring cores;
    filling each of said slits with resin so as to secure said plurality of split ring cores in said ring forming said circular hole;
    forming a thin-film insulating layer on a surface extending from said split ring cores to an intermediate portion of said plurality of said coil support cores;
    forming a stator core having a plurality of magnetic partial core members, each of which is constituted by said split ring core and said coil support core, arranged to form a ring-shape and secured in said ring shape by said resin, by punching at the intermediate portion of said plurality of said coil support cores at which said insulating layer is not formed, the stator core having a flat magnetic housing having an outer peripheral wall whose diameter is equal to a diameter of a circle defined by connecting outer edges of the coil support cores, an inner peripheral wall whose diameter is smaller than a diameter of the circular hole formed by the magnetic split ring core elements, and holes arranged for the coils, wherein the outer edges of the coil support cores abut on an inside surface of the outer peripheral wall of the flatmagnetic housing;
    mounting pre-formed cylindrical coils, prepared separately from said magnetic partial core members, by inserting said coils on each of said coil support cores; and connecting each of said coils for conduction; and
    mounting the stator core on a housing.

* * * * *

UNITED STATES PATENT AND TRADEMARK OFFICE
CERTIFICATE OF CORRECTION

PATENT NO. : 7,327,065 B2  Page 1 of 1
APPLICATION NO. : 11/064676
DATED : February 5, 2008
INVENTOR(S) : Nobuho Kimura It is certified that error appears in the above-identified patent and that said Letters Patent is hereby corrected as shown below:

Column 1, line 23, "of other" should read --of another--;

Column 2, line 30, "cores are" should read --cores, are--;

Column 2, line 60, "members is" should read --members are--;

Column 7, line 6, "reduce" should read --reduces--;

Column 7, line 22, "preformed" should read --pre-formed--;

Column 7, line 41, "form" should read --forms--;

Column 8, line 60, "flatmagnietic" should read --flat magnetic--.

Signed and Sealed this

Third Day of March, 2009

JOHN DOLL
*Acting Director of the United States Patent and Trademark Office*